Sept. 27, 1966 A. SEYLER 3,274,877
BIAS CUTTER FOR WEBS, ESPECIALLY FOR LAYERS OF TIRES
Filed Nov. 16, 1964
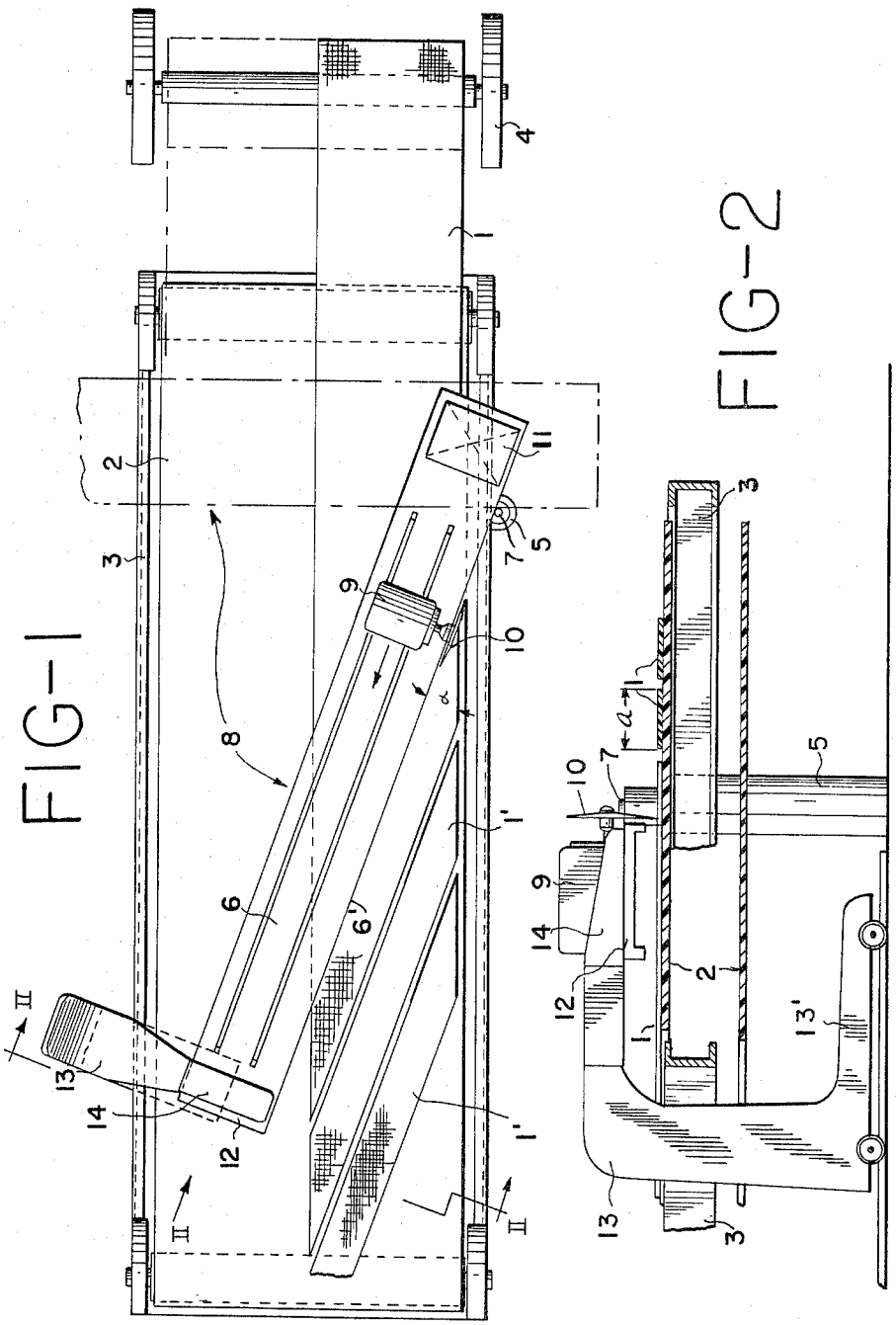
INVENTOR.
ALFRED SEYLER
BY United States Patent Office 3,274,877
Patented Sept. 27, 1966

3,274,877
BIAS CUTTER FOR WEBS, ESPECIALLY FOR LAYERS OF TIRES
Alfred Seyler, Hannover, Germany, assignor to Continental Gummi-Werke A.G., Hannover, Germany
Filed Nov. 16, 1964, Ser. No. 411,315
Claims priority, application Germany, Nov. 19, 1963, C 31,458
4 Claims. (Cl. 83—473)

The present invention relates to a bias cutter for webs, especially for layers of tires, which comprises a beam arranged above a table and tiltable about a shaft while being supported at its free end and carrying a cutting blade displaceable along said beam.

With cutters of the above-mentioned type, the beam guiding said cutting blade is arranged on a table for receiving said layers and, more specifically, at a certain angle in conformity with the bias along which said layers are to be cut. Bias cutters of the type involved have generally proved successful except when the layers or webs have to be cut at a small angle, as for instance 15°. For this purpose, a relatively long blade supporting beam is necessary, for instance a beam having a length of approximately 10 yards. Such a long beam is unfeasible, aside from the fact that it would considerably increase the cost of the entire cutting operation.

It is, therefore, an object of the present invention to provide a bias cutter of the general type involved, which will overcome the above-mentioned drawbacks.

It is another object of this invention to provide a bias cutter for cutting webs, especially tire layers, at a bias which will make it possible to cut webs and layers at a rather small angle with highly simplified constructions.

These and other objects and advantages of the invention will appear more clearly from the following specification in connection with the accompanying drawing, in which:

FIG. 1 digrammatically illustrates a top view of a bias cutter for cord or fabric webs or layers for the manufacture of pneumatic tires.

FIG. 2 diagrammatically illustrates a section taken along the line II—II of FIG. 1 but on a somewhat larger scale than FIG. 1.

The bias cutter according to the present invention is characterized primarily in that the supported free end of the cutter beam, in other words the end of the path of the blade, will at small cutting angles, i.e. angles from 15 to 20°, be located within the range of the vertical projection of the cutting table. Expressed differently, the free end of the beam or the free end of the guiding means for the cutting blade is located within the range of the table surface when looking at the table from above. Such supporting means for the free end of the beam may for instance have the form of a cantilever to which the free end of the cutting beam is connected.

If it is desired to bias cut webs of fabric or the like at a small angle, the beam is placed into the corresponding inclined or slant position. The reason why the beam can occupy such a position even though it has an insufficient length consists in that it is supported by the above-mentioned special supporting means. The web to be cut into individual bias strips in the respective inclined position of the beam will have a width which is less than that of the cutting table so that the cutting blade will be able to cut said web.

The arrangement according to the present invention as illustrated in FIG. 1 comprises a table 3 on which the tire web 1 to be cut is advanced stepwise, for instance by a conveyor belt 2. Table 3 has a certain not variable width and is preceded by support 4 for supporting the roll from which said web 1 to be cut is being withdrawn. The means preceding table 3 may, however, also be designed in a way different from that shown in the drawing.

Adjacent table 3 there is provided a leg 5 supporting a vertical shaft 7 on which a cutting beam 6 is pivotally mounted. Beam 6 may thus be turned in either direction about shaft 7 as indicated by the double arrow 8, thereby permitting adjustment of beam 6 in conformity with the desired bias or cutting angle α.

The cutting means and the means for actuating the same are supported by beam 6. More specifically, a cutting carriage 9 is movable back and forth on beam 6 in longitudinal direction thereof. The cut is effected substantially along edge 6' of beam 6 and is effected by a rotary knife 10. Carriage 9 has associated therewith a driving unit 11 which is located on that part of beam 6 which protrudes rearwardly beyond shaft 7.

The free end 12 of beam 6 is supported by a supporting body 13 of U-shape with the legs of said U-shaped body extending substantially horizontally while being located in a vertical plane. The length of the cantilever arm 14 is so selected that beam 6 may be moved to a position in which, in conformity with FIG. 1, the end of the cutting path along edge 6' is located above conveyor belt 2.

The bias cutter may be employed for various widths of fabric webs 1. If, for instance, it is desired to cut the web at an angle α of approximately 45°, a web 1 may be employed which extends over the entire width of conveyor belt 2. If, however, the web is to be cut into sections 1' at a relatively small angle α, the width of the fabric web 1 is reduced. In other words, a web 1 is fed to the bias cutter which has a width depending on the lateral projection of the cutting edge 6'.

This reduction in the width of the web is not disadvantageous. As is well known, the web sections 1' which in plan view are parallelogram-shaped are following the cutting operation composed to webs the width of which corresponds to the width a. However, since the web sections 1' due to the small angle α will also at a narrow width of the supplied fabric web 1 have a relatively great length, the joints of the joined sections 1 will be sufficiently widely spaced from each other in the composed web.

From the above it will thus be evident that by means of the relatively short cutting beam 6 a proper product for the manufacture of tires will be obtained, while a relatively short cutting beam 6 will be sufficient to permit the bias cutting of a web at a small angle α, i.e. at an angle within the range of from 10 to 20°.

The supporting body 13 may have any desired suitable construction. However, preferably, the supporting body 13 is given a U shape so that its lower leg 13' may rest on the floor or the ground, whereas the upper leg or arm 14 supports the free end 12 of beam 6. The distance between the leg 13' and arm 14 is so selected that the table 3 may be enclosed between the said parts. The U shape of supporting body 13 has the further advantage that the lower leg 13' may be equipped with rollers, casters, or the like, so that it can easily be displaced on the floor and be moved to wherever it is needed.

The arrangement of shaft 7 in the neighborhood of or directly adjacent to cutting edge 6' is highly advantageous inasmuch as it permits making use of the cutting path also when beam 6 occupies such a position in which it forms a small angle α with regard to the cutting table 3.

It is, of course, to be understood that the present invention is, by no means, limited to the particular construction shown in the drawing but also comprises any modifications within the scope of the appended claims.

What is claimed is:

1. An apparatus for cutting fabrics, especially on the bias, comprising; a table having a horizontal top over which the fabric can be moved in the direction of its length, vertical pivot means stationarily mounted adjacent the table at one side of the table, a beam pivotally supported on said pivot means and extending horizontally over said table top, cutter means moveably guided along said beam for horizontal movement on the beam in the direction of the length of the beam and operable to cut fabric on said table top in the direction of the length of said beam, said beam being swingable in a horizontal plane on said pivot means to such an operative angle as to dispose the free end of the beam which is at the end thereof opposite said pivot means within the lateral limits of said table top, a carriage moveable adjacent the table on the side thereof opposite said pivot means, and means supportingly connecting the end of the beam opposite said pivot means to said carriage.

2. An apparatus for cutting fabrics, especially on the bias, comprising; a table having a horizontal top over which the fabric can be moved in the direction of its length, vertical pivot means mounted adjacent the table at one side, a beam pivotally supported on said pivot means and extending horizontally over said table top, cutter means moveable along said beam and operable to cut fabric on said table top in the direction of said beam and along one side edge of the beam, said beam being swingable on said pivot means to such an operative angle as to dispose the free end of the beam opposite said pivot means within the lateral limits of said table top, said pivot means being connected to said beam so that the vertical pivot axis defined by the pivot means is located adjacent said one side edge of the beam, a carriage moveable adjacent the table on the side thereof opposite said pivot means, and means supportingly connecting the end of the beam opposite said pivot means to said carriage.

3. An apparatus according to claim 2 in which said carriage comprises a wheel supported base beneath the table top, said carriage also comprising a head above the table connected to the free end of the beam and extending laterally therefrom, said carriage also comprising a column extending vertically from said head to said base whereby said carriage is C shaped so that the edge of the table can be received therein.

4. An apparatus for cutting fabric into strips, especially on the bias, comprising; a table having a horizontal top spaced from a supporting surface, said horizontal top comprising conveyor means for conveying fabric across the table the direction of the length of the fabric, a beam extending horizontally above the table top, cutting means carried by the beam and moveable in the direction of the length of the beam and including a cutter element operable for cutting fabric on the table top along one side edge of the beam, vertical pivot means adjacent one side of the table pivotally engaging said beam in the region of the said one side edge thereof and supporting the beam for horizontal swinging movements in a horizontal plane above the table top, support means for the free end of the beam on the opposite side of the table from the said vertical pivot means and including a wheeled base portion resting on said supporting surface below the table top, said support means also including a head portion connected to the free end of the beam and extending laterally therefrom and a vertical column portion supportingly connecting the base portion with the head portion and also spaced laterally from said beam, the said structure of said support means being such that it defines a C shaped structure opening in the lateral direction of the beam and thus adapted to receive the edge of the table in the throat thereof whereby said beam can be positioned at such angularity to the length of the table that the free end of the beam is disposed between the side edges of the table while remaining supported by said support means.

References Cited by the Examiner
UNITED STATES PATENTS

| | | | |
|---|---|---|---|
| 1,732,149 | 10/1929 | Barrett | 83—486 X |
| 2,261,837 | 11/1941 | Allen | 83—578 X |
| 3,192,815 | 7/1965 | Zimmerman | 83—471 |

WILLIAM S. LAWSON, *Primary Examiner.*